United States Patent [19]
Durbin

[11] Patent Number: 4,597,922
[45] Date of Patent: Jul. 1, 1986

[54] MOLDING RF MOLDABLE THERMOPLASTIC COMPOSITIONS

[75] Inventor: Daniel P. Durbin, Sugar Land, Tex.

[73] Assignee: Shell Oil Company, Houston, Tex.

[21] Appl. No.: 614,626

[22] Filed: May 29, 1984

[51] Int. Cl.$^4$ .................... B29C 35/08; B29C 35/12
[52] U.S. Cl. ........................... 264/26; 264/DIG. 46; 264/DIG. 69; 425/174.8 E
[58] Field of Search ............... 264/26, 25, DIG. 45, 264/22, DIG. 46, DIG. 69; 425/174.8 E

[56] References Cited

U.S. PATENT DOCUMENTS

| | | | |
|---|---|---|---|
| 2,891,284 | 6/1959 | Levin et al. | 264/26 |
| 3,072,960 | 1/1963 | Smythe et al. | 425/174.8 R |
| 3,192,291 | 6/1965 | D'Onofrio | 264/26 |
| 3,207,819 | 9/1965 | Raddin et al. | 264/26 |
| 3,253,064 | 5/1966 | Buonaiuto | 264/26 |
| 3,586,743 | 6/1971 | Van Erck | 264/22 |
| 3,806,562 | 4/1974 | Lamort et al. | 264/31 |
| 3,936,412 | 2/1976 | Rocholl | 264/26 |
| 4,296,053 | 10/1981 | Doerer et al. | 264/26 |

FOREIGN PATENT DOCUMENTS

| | | | |
|---|---|---|---|
| 2144536 | 3/1972 | Fed. Rep. of Germany | 264/DIG. 69 |
| 2305286 | 11/1976 | France | 264/DIG. 69 |
| 1238881 | 7/1971 | United Kingdom | 264/25 |

Primary Examiner—Jeffery Thurlow
Attorney, Agent, or Firm—Peter A. Bielinski

[57] ABSTRACT

A process for the production of moldings from a dry blend of radio frequency susceptible organic polymer particles and rigid inorganic particles wherein the dry blend mixture is poured into a non-radio frequency absorbing mold and scintered using a radio frequency field to form a composite structure.

8 Claims, No Drawings

MOLDING RF MOLDABLE THERMOPLASTIC COMPOSITIONS

The invention relates to a process for the production of RF moldable thermoplastic compositions from a dry blend mixture of an RF absorbing thermoplastic resin component and a rigid inorganic particle component and the process for making these compositions.

SUMMARY OF THE INVENTION

The present invention relates to the use of a dry blend mixture of a radio frequency susceptible thermoplastic resin component and a rigid inorganic component. This dry blend mixture may be poured into a non-radio frequency absorbing mold of any desired shape, optionally subjected to modest pressure, and scintered using a radio frequency field to form a composite structure. Materials manufactured in this manner have been found to be strong in compression and maintained integrity with a very high ratio of inorganic particles to organic polymeric material.

These materials can have an inherent thermal insulation by the control of the intersticial space between the particles. This may be accomplished through control of the particle geometry and the amount of thermoplastic resin present.

DETAILED DESCRIPTION OF THE INVENTION

Thermoplastic resins which can be useful in the process of the present invention include those thermoplastic resins which when subjected to a radio frequency field absorb radio frequency energy and are consequently heated. Examples of thermoplastic resins useful in the process of the present invention include polyvinyl cloride, thermoplastic urethanes, polymethylmethacrylate and other weatherable thermoplastics. The dry thermoplastic resin particles may be one polymer or a mixture of polymers and may be derived from scrap thermoplastic polymeric materials, for example, reground waste rigid polyvinyl chloride pipe. Particle size of the resin particles may vary widely and diameters from 0.01 to about 20 millimeters are preferred.

The rigid inorganic particles useful in the process of the present invention include any inorganic particles rigid enough in compression to form a reasonably strong composition after molding. The particles may be granular or fiberous. Suitable examples of rigid inorganic particles include gravel or crushed stone, mineral wool shot, sand, etc. In addition, a low density inorganic filler may be added, e.g., pearlite, pumice, vermiculite, etc. Combinations of inorganic fillers may also be used. The particle size of the rigid inorganic particles may vary widely, however, particles having a diameter from about 0.01 millimeter to about 20 millimeters diameter or larger may be used, depending on the size of the molded article desired and on the ratio of resin to inorganic particles desired.

The radio frequency field may be at any frequency which will be absorbed by the thermoplastic resin component. A typical frequency is 100 megahertz. The dry blend mixture must be heated to a temperature sufficient to effect melting substantially all of the thermoplastic resin particles so as to form a binding matrix between the rigid inorganic particles.

The compositions of the present invention may be modified with supplementary materials including pigments, other filler and the like as well as stabilizers and oxidation inhibitors.

A preferred use of the present composition when molded is in the construction area, for example, in the construction of exterior walls and the like.

The dry blend mixtures of the present invention may be poured into non-radio frequency absorbing molds, for example, silicone molds of the desired shape. The molds may be formed from any material which is substantially transparent to the radio frequency energy being used.

The invention is further illustrated by means of the following illustrative embodiments, which are given for the purpose of illustration alone and are not meant to limit the invention to any particular reactants and amounts disclosed.

EXAMPLES

In the following examples, inorganic gravel particles were commercially available epoxy resin coated gravel approximately 4 millimeters in diameter. The thermoplastic resin used in examples 1 and 2 was reground, rigid polyvinyl chloride pipe and in example 3 was a developmental high modulus thermoplastic urethane resin available from Upjohn Corp. as Pellethane X0125. Both thermoplastic resins were approximately 4 millimeters in diameter. The dry blend mixtures were prepared in the ratios given below in the Table and were poured into a silicone mold. These molds were clamped with approximately ten pounds per square inch force between parallel electrodes, and subjected to a 100 megahertz radio frequency field until melting of the thermoplastic resin phase was evident. All of the molded specimens showed good compression strength and possessed high integrity.

TABLE 1

|     | Inorganic Particles | Thermoplastic Resin | Weight % Thermoplastic Resin |
| --- | --- | --- | --- |
| (1) | Resin Coated Gravel | Reground Rigid PVC Pipe | 30% |
| (2) | Resin Coated Gravel | Reground Rigid PVC Pipe | 10% |
| (3) | Resin Coated Gravel | Pellethane X0125 | 20% |

What is claimed is:

1. A process for the production of moldings from a dry blend mixture of between about 5% to 60% by weight of a radio frequency susceptible organic thermoplastic resin and between about 40% and about 95% by weight of a rigid substantially non-radio frequency absorbing inorganic particulate filler wherein said dry blend is poured into a non radio frequency absorbing mold and scintered using a radio frequency field to form a composite structure.

2. The process of claim 1 wherein the thermoplastic resin component is present at between 5 and 60% by weight of the composite.

3. The process of claim 1 wherein the thermoplastic resin component is present at between 5 and 25% by weight of the composite.

4. The process of claim 1 wherein the thermoplastic resin is polyvinyl chloride.

5. The process of claim 1 wherein the thermoplastic resin component is reground rigid polyvinyl chloride pipe.

6. The process of claim 1 wherein the rigid inorganic particulate material is selected from the group consisting of gravel, sand, mineral wool shot, pearlite, vermiculite and pumice.

7. The process of claim 1 wherein the dry blend mixture after being poured into said mold is subjected to pressure.

8. The process of claim 1 wherein the radio frequency field is a 100 megahertz radio frequency field.

* * * * *